United States Patent
Taylor et al.

(10) Patent No.: US 9,918,550 B1
(45) Date of Patent: Mar. 20, 2018

(54) MOBILE WORKSTATION

(71) Applicant: Brunswick Corporation, Lake Forest, IL (US)

(72) Inventors: Paul Melvin Taylor, Lake in the Hills, IL (US); Paul Brian Siebert, Chicago, IL (US); Christopher Justin Mayer, Chicago, IL (US)

(73) Assignee: Brunswick Corporation, Mettawa, IL (US)

( * ) Notice: Subject to any disclaimer, the term of this patent is extended or adjusted under 35 U.S.C. 154(b) by 85 days.

(21) Appl. No.: 15/180,527

(22) Filed: Jun. 13, 2016

Related U.S. Application Data

(63) Continuation-in-part of application No. 29/533,828, filed on Jul. 22, 2015, now Pat. No. Des. 792,388.

(60) Provisional application No. 62/211,222, filed on Aug. 28, 2015.

(51) Int. Cl.
| | |
|---|---|
| *A47B 83/00* | (2006.01) |
| *A47B 21/02* | (2006.01) |
| *A47B 88/04* | (2006.01) |
| *A47B 21/03* | (2006.01) |
| *G06F 3/14* | (2006.01) |

(52) U.S. Cl.
CPC ............ *A47B 83/001* (2013.01); *A47B 21/02* (2013.01); *A47B 21/0314* (2013.01); *A47B 88/04* (2013.01); *G06F 3/1431* (2013.01); *A47B 2021/0364* (2013.01); *A47B 2200/0066* (2013.01); *A47B 2220/0077* (2013.01); *A47B 2220/0091* (2013.01)

(58) Field of Classification Search
CPC .................................................... A47B 83/001
See application file for complete search history.

(56) References Cited

U.S. PATENT DOCUMENTS

| | | | |
|---|---|---|---|
| 5,244,267 A | 9/1993 | Fossier, Jr. et al. | |
| 5,282,341 A | 2/1994 | Baloga et al. | |
| 5,528,248 A * | 6/1996 | Steiner | G01C 21/20 342/357.31 |
| 5,624,312 A | 4/1997 | Collier | |
| 5,687,513 A | 11/1997 | Baloga et al. | |
| 5,941,713 A | 8/1999 | Wayner et al. | |
| 6,205,716 B1 | 3/2001 | Peltz | |
| 6,248,014 B1 | 6/2001 | Collier | |
| 6,267,345 B1 | 7/2001 | Turner | |
| D453,754 S | 2/2002 | Petersen | |
| 6,493,220 B1 | 12/2002 | Clark et al. | |
| 6,712,008 B1 | 3/2004 | Habenicht et al. | |

(Continued)

OTHER PUBLICATIONS

Media:scape Kiosk, Collaboration Solution, Steelcase brochure, Oct. 13, 2013, 2 pages.

(Continued)

*Primary Examiner* — Liliana Cerullo
(74) *Attorney, Agent, or Firm* — Andrus Intellectual Property Law, LLP

(57) ABSTRACT

A mobile workstation is for supporting a first display and a work surface. The mobile workstation has a base supported on wheels, a body that extends in an axial direction from the base, and a track coupled to a front surface of the body and configured to support the first display and the work surface. The first display and the work surface are movable along the track to a plurality of user preferred positions.

17 Claims, 6 Drawing Sheets

(56) References Cited

U.S. PATENT DOCUMENTS

| | | |
|---|---|---|
| 6,732,660 B2 | 5/2004 | Dame et al. |
| D505,948 S | 6/2005 | Vrachan |
| 7,009,840 B2 | 3/2006 | Clark et al. |
| 7,032,523 B2 * | 4/2006 | Forslund, III ......... A47B 21/00 108/50.01 |
| D532,782 S | 11/2006 | Russo |
| D565,044 S | 3/2008 | Witts |
| D590,387 S | 4/2009 | Chen |
| D591,078 S | 4/2009 | Singler |
| D605,191 S | 12/2009 | Kuroda |
| 7,823,973 B2 | 11/2010 | Dragusin |
| D628,742 S | 12/2010 | Hsu |
| 7,942,372 B2 | 5/2011 | Koh |
| D646,269 S | 10/2011 | Crick, Jr. |
| 8,074,581 B2 | 12/2011 | Epstein et al. |
| 8,186,640 B2 | 5/2012 | Bertrand |
| D661,292 S | 6/2012 | Kuroda |
| 8,292,807 B2 | 10/2012 | Perkins et al. |
| D695,285 S | 12/2013 | Smith |
| 8,662,605 B2 | 3/2014 | McRorie et al. |
| D701,860 S | 4/2014 | Daniel |
| D707,674 S | 6/2014 | Daniel |
| 8,804,321 B2 | 8/2014 | Kincaid et al. |
| D717,785 S | 11/2014 | Winston |
| D723,025 S | 2/2015 | Birgeoglu |
| D727,307 S | 4/2015 | Kraft |
| D727,308 S | 4/2015 | Kraft |
| D730,355 S | 5/2015 | Daniel |
| D732,520 S | 6/2015 | Themann |
| D742,870 S | 11/2015 | Berini |
| D751,061 S | 3/2016 | Berini |
| D752,032 S | 3/2016 | Taylor |
| D760,711 S | 7/2016 | Berini |
| D762,635 S | 8/2016 | Szeredi |
| D769,238 S | 10/2016 | Birnie |
| D769,864 S | 10/2016 | Hoffmann |
| D743,956 S | 11/2016 | Kraft |
| D770,576 S | 11/2016 | Siebert |
| D774,029 S | 12/2016 | Kim |
| D781,279 S | 3/2017 | Horn, II |
| D781,843 S | 3/2017 | Horn, II |
| D788,098 S | 5/2017 | Thornton |
| D792,388 S | 7/2017 | Taylor |
| 2002/0124271 A1 | 9/2002 | Herrmann et al. |
| 2010/0155563 A1 | 6/2010 | Koh |
| 2012/0174833 A1 | 7/2012 | Early et al. |
| 2012/0212116 A1 * | 8/2012 | McRorie ................... B62B 3/02 312/249.13 |
| 2013/0026310 A1 | 1/2013 | Belcourt-McCabe |
| 2015/0305086 A1 * | 10/2015 | Uttley ...................... B62B 1/12 280/652 |

OTHER PUBLICATIONS

Portable Workstations, http://www.godfreygroup.com/portable-workstations.html, website visited Jun. 12, 2015.

* cited by examiner

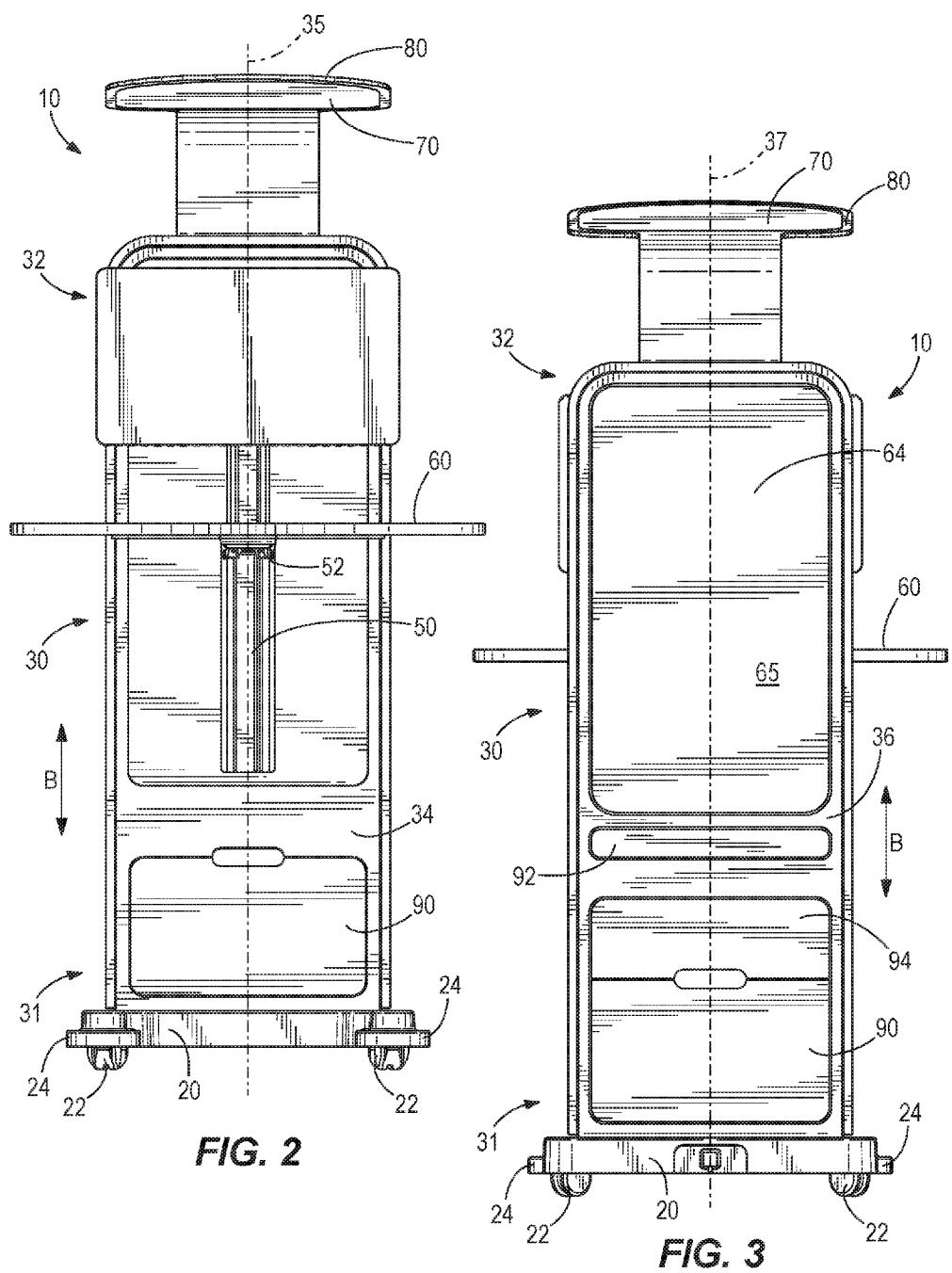

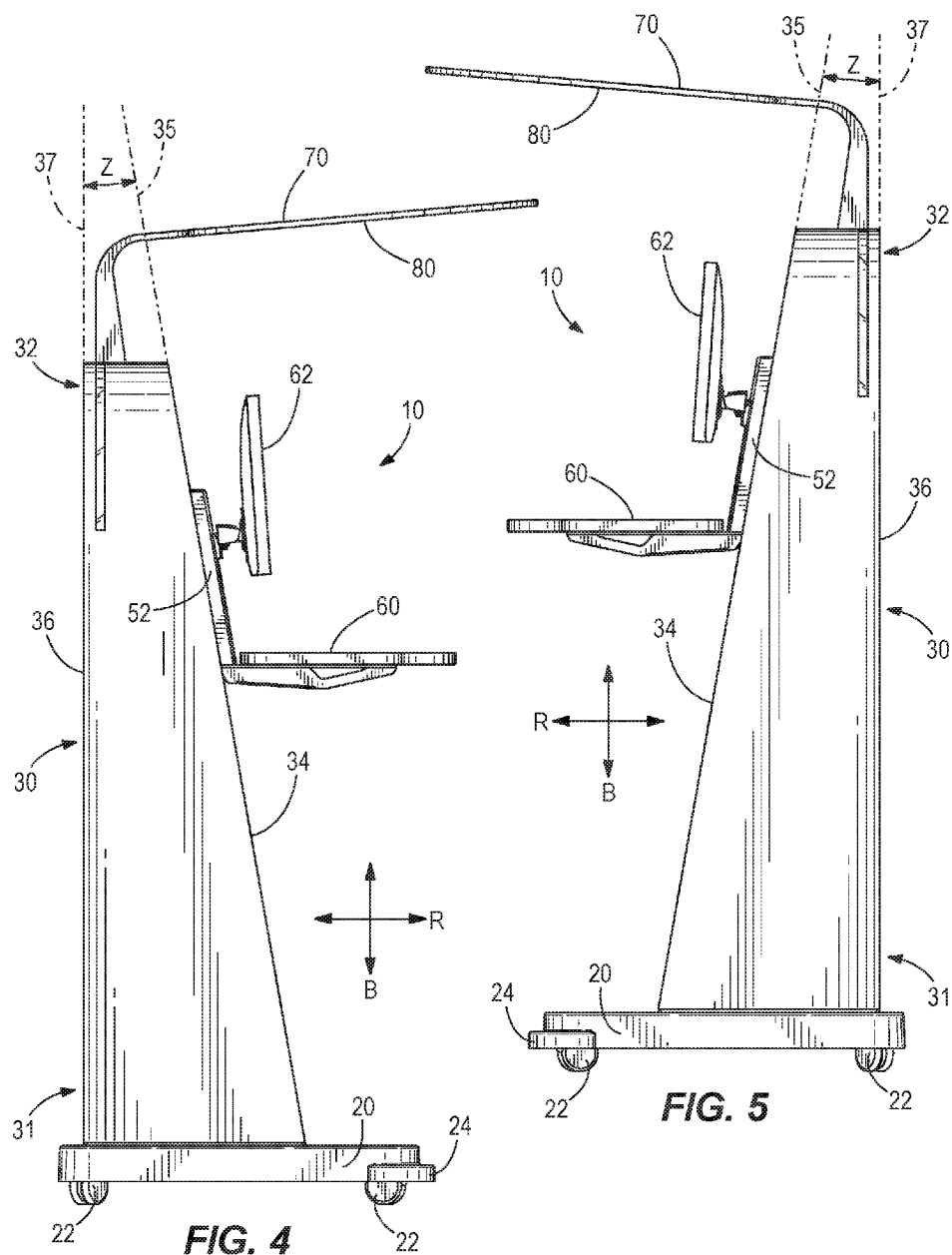

MOBILE WORKSTATION

CROSS REFERENCE TO RELATED APPLICATIONS

This application claims the benefit of and priority to U.S. Provisional Patent Application No. 62/211,222, filed Aug. 28, 2015, and U.S. Design patent application Ser. No. 29/533,828, filed Jul. 22, 2015, which are hereby incorporated by reference in entirety.

FIELD

The present disclosure relates to workstations, specifically mobile workstations with movable work surfaces and displays.

BACKGROUND

The following U.S. Patent Application and U.S. Patent are hereby incorporated by reference in their entirety:

U.S. patent application Ser. No. 13/560,417 discloses an interactive projector mobile apparatus for use as an interactive projector system. The interactive projector apparatus comprises a rotatable projector mount for mounting a projector. The projector may be used to project images on a vertical or horizontal surface. The interactive projector mobile apparatus may also comprise a moveable column on which the projector is mounted.

U.S. Pat. No. 8,662,605 discloses a mobile technology cabinet that includes a compartment having a work platform mounted for rotational motion between a substantially vertical storage position and a deployed position. A monitor support is operatively connected to the work platform such that movement of the work platform between the storage position and the deployed position causes the monitor support to rise from a storage position to a deployed position. The work platform may be rotated relative to the cabinet to simultaneously deploy the work surface and to raise the monitor. A base supports the cabinet for movement on wheels. A frame extends from the base and supports a cabinet such that the cabinet is movable between a raised position and a lowered position.

SUMMARY

This Summary is provided to introduce a selection of concepts that are further described herein below in the Detailed Description. This Summary is not intended to identify key or essential features from the claimed subject matter, nor is it intended to be used as an aid in limiting the scope of the claimed subject matter.

In certain examples, a mobile workstation is for supporting a first display and a work surface thereon. The mobile workstation comprises a base that is supported on wheels, a body that extends in an axially direction from the base and has a front surface; and a track that is coupled to the front surface and configured to support the first display and the work surface. The first display and the work surface are movable along the track to a plurality of user-preferred positions.

In certain examples, the mobile workstation comprises a base supported on wheels, a body supported on the base and having a front surface, a track coupled to the front surface, and a first display coupled to and supported by the track. The first display is movable along the track to a plurality of user-preferred locations. A controller is configured to control the first display such that information is displayed by the first display.

BRIEF DESCRIPTION OF THE DRAWINGS

Example mobile workstations are described with reference to the following drawing FIGURES. Like reference numbers are used throughout the FIGURES to reference like features and components.

FIG. 2 is a front side elevation view of the mobile workstation depicted in FIG. 1.

FIG. 3 is a rear side elevation view of the mobile workstation depicted in FIG. 1.

FIG. 4 is a left side elevation view of the mobile workstation depicted in FIG. 1.

FIG. 5 is a right side elevation view of the mobile workstation depicted in FIG. 1.

DETAILED DESCRIPTION

Figure 1:
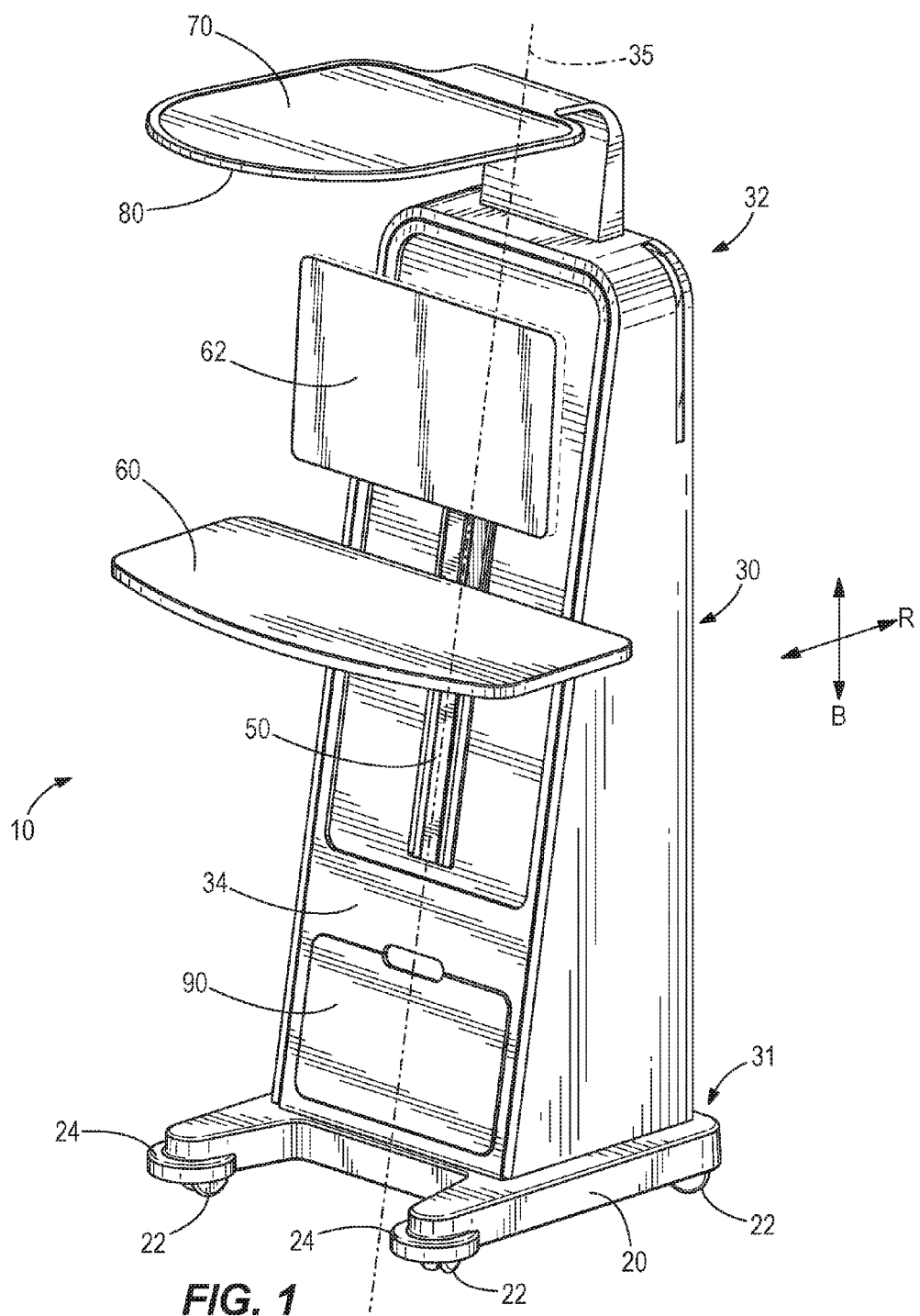
FIG. 1 is an example mobile workstation.
Figure 6:
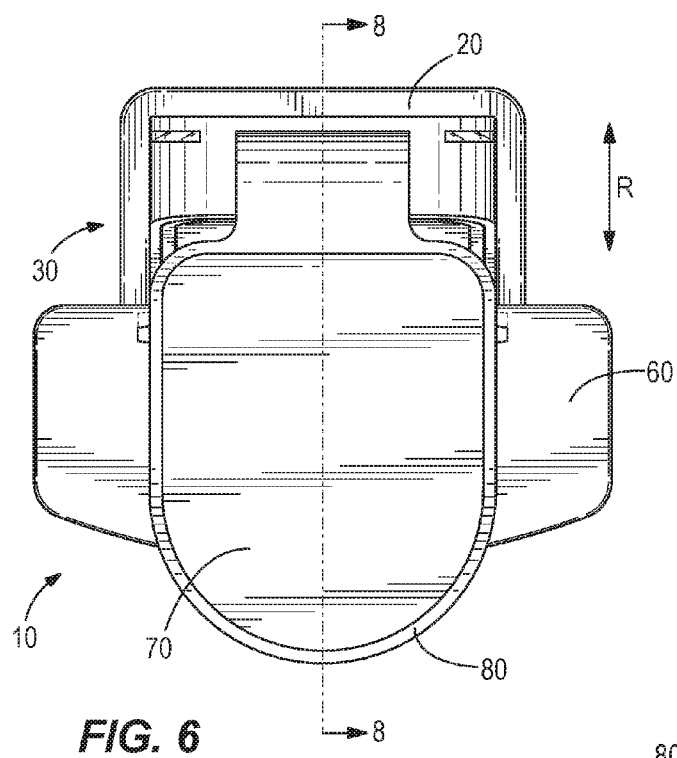
FIG. 6 is a top view of the mobile workstation depicted in FIG. 1.
Figure 7:
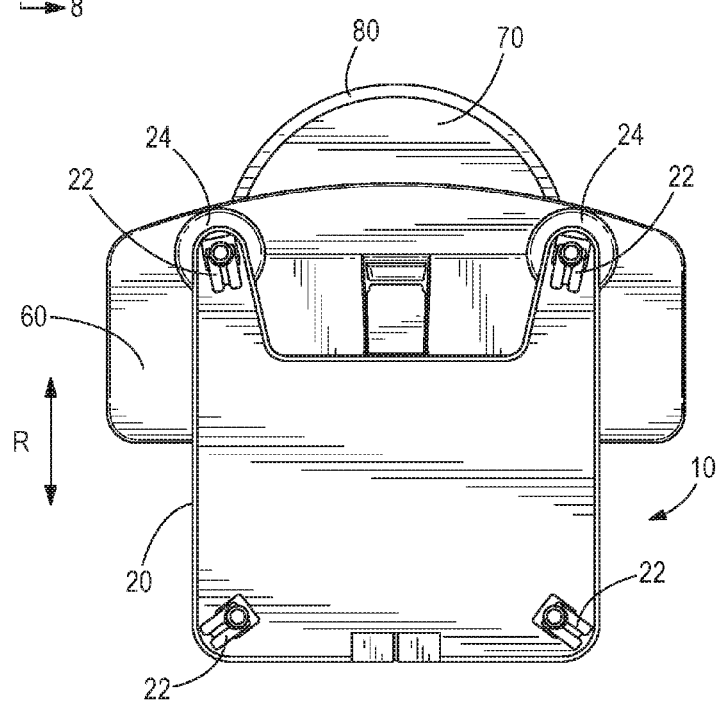
FIG. 7 is a bottom view of the mobile workstation depicted in FIG. 1.
Figure 8:
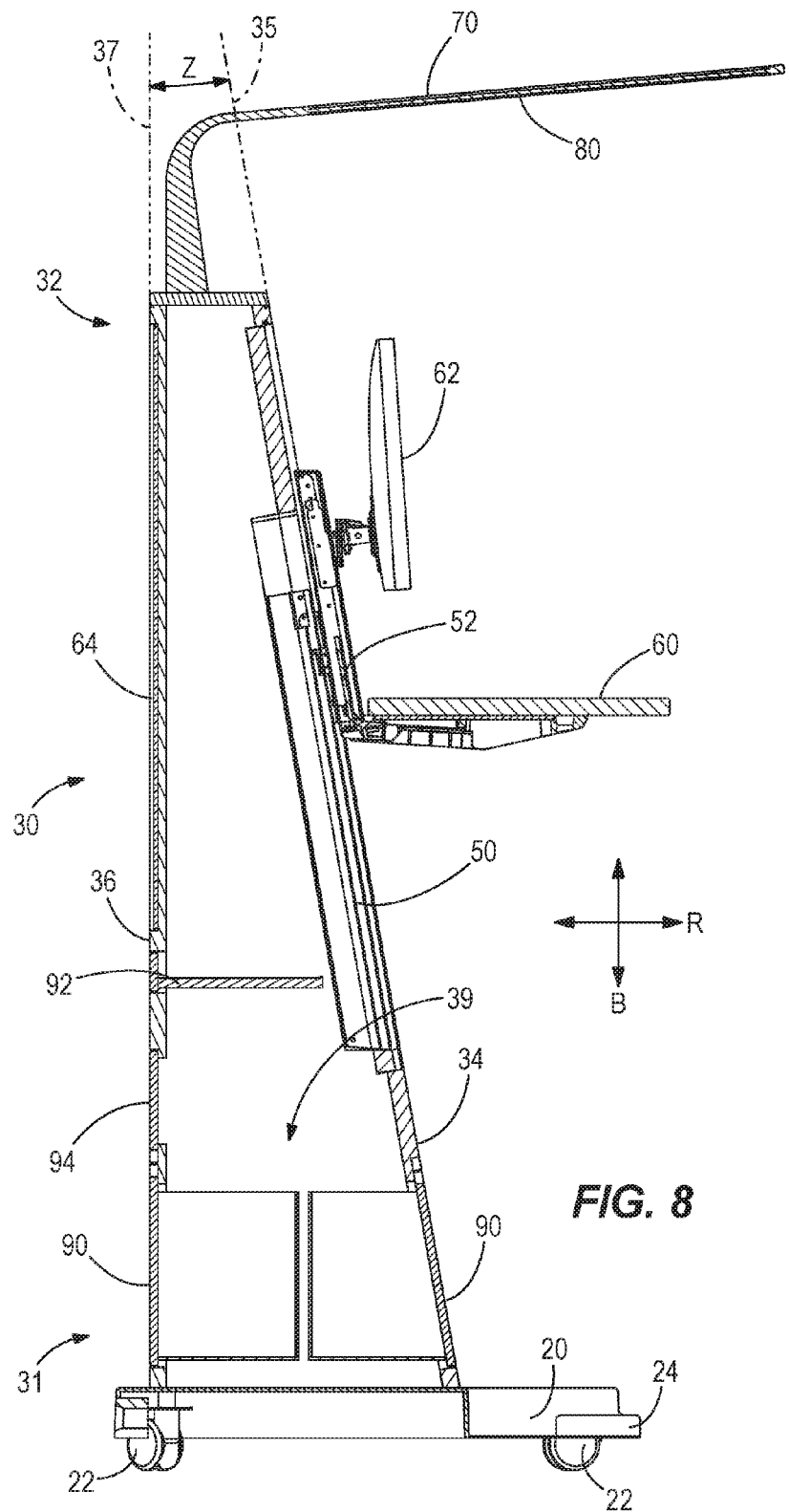
FIG. 8 is a cross sectional view of the mobile workstation depicted in FIG. 1 along line 8-8 shown in FIG. 6.

The present disclosure includes examples of mobile workstations that support work surfaces and displays. In one example, the mobile workstation has a track that is configured to support a work surface and a first display such that the work surface and/or first display are movable along the track to a user-preferred position selected by a user.

Work spaces, especially large office spaces, often contain stationary desks or workstations for each user. However, these workstations remain in one location as the user moves throughout the work space to interact and exchange information with other employees. Through research and experimentation, the present inventors have determined that collaboration, sharing of ideas, and/or person-to-person interaction significantly increases employee productivity. Accordingly, through research and experimentation, the present inventors have determined that mobile workstations increase person-to-person interaction between employees or users and increases employee productivity. The mobile workstations disclosed herein allow the user move the workstation throughout the work space or office and allow the user to make vertical or height adjustments of coupled work surfaces and/or displays.

Referring to FIGS. 1-8, an exemplary mobile workstation 10 is depicted. The workstation 10 includes a body 30 which extends in an axial direction B between a first end 31 and a second end 32. The body 40 has a front surface 34 and a rear surface 36 opposite the front surface 34. The front surface 34 extends along a first centerline 35, and the rear surface 36 extends along a second centerline 37. The first and second centerlines 35, 37 are transversely orientated to each other at an angle Z (see FIGS. 4-5). The angle Z can vary and in some examples is in the range of 5-30 degrees. The body 30 defines an internal cavity 39 (see FIG. 8). The body 30 can be defined by any number of surfaces or sides and can be any shape. In one example, the body 30 is a polyhedron with square and rounded edges (see FIGS. 1 and 4-5). The size and/or shape of the body 30 can be modified to change the center of gravity of the workstation 10 such that workstation 10 is less likely to tilt and/or topple over.

The workstation 10 includes a track 50 coupled to the front surface 34 of the body 30. The track 50 is configured to support an apparatus, such as a work surface 60 and a first display 62 (both discussed further herein) such that the work surface 60 and/or the first display 62 are movable along the track 50. The track 50 defines a plurality of positions at which the user can move the work surface 60 and/or front display 62. For example, the user can move the work surface 60 and/or first display 62 to a user-preferred position that is related to the height of the user. The track 50 includes a locking mechanism (not shown) that is configured such that the user can lock and unlock the work surface 60 and/or front display 62 at various positions along the track 50. A bracket 52 couples the work surface 60 and/or first display 62 to the track 50. As explained further herein, the bracket 52 can comprise multiple portions which can move together or independently of each other such that the work surface 60 and first display 62 move together or independently of each other, respectively.

The work surface 60 is removably coupled to the workstation 10 and is configured to support objects such as keyboards, notepads, and/or the like. Multiple work surfaces can be included with the workstation 10, and the work surface 60 can be constructed out of any suitable material including wood, laminated particle board, metal, plastic, ceramic, and/or the like.

Figure 9:
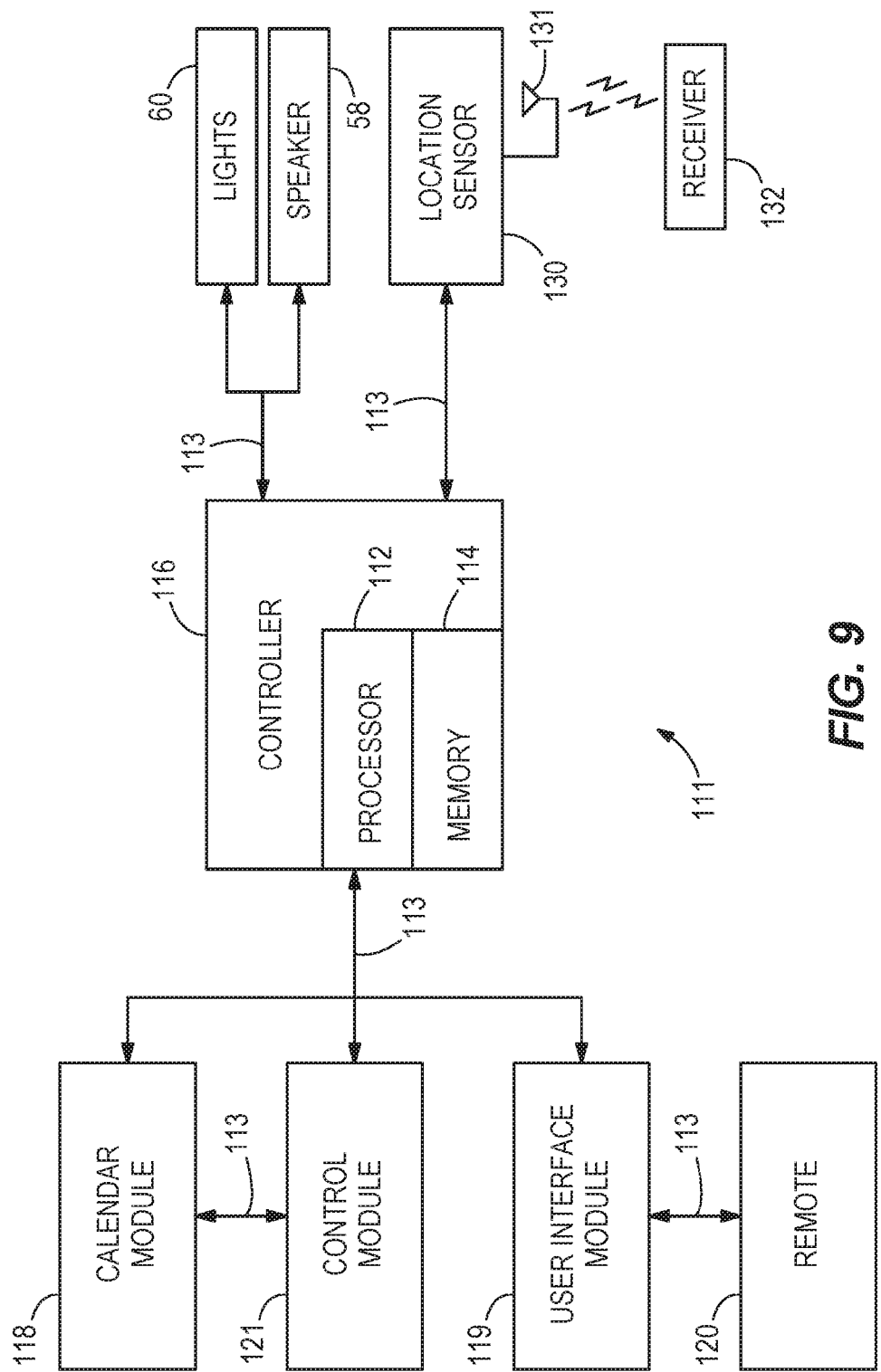
FIG. 9 is an example system diagram.

Referring to FIG. 9, the workstation 10 can be part of and controlled by a system 111. The system 111 includes a controller 116 that is programmable and includes a processor 112 and a memory 114. The controller 116 can be located anywhere in the system 111 and/or located remote from the system 111 and can communicate with various components of the workstation 10 via wired and/or wireless links, as will be explained further herein below. Although FIG. 9 shows a single controller 116, the system 111 can include more than one controller 116. Portions of the method can be carried out by a single controller or by several separate controllers. Each controller 116 can have one or more control sections or control units. One having ordinary skill in the art will recognize that the controller 116 can have many different forms and is not limited to the example that is shown and described. For example, here the controller 116 carries out display and notification methods for the entire system 111, but in other examples separate units could be provided.

In some examples, the controller 116 can include a computing system that includes a processing system, storage system, software, and input/output (I/O) interfaces for communicating with devices such as those shown in FIG. 9, and about to be described herein. The processing system loads and executes software from the storage system, such as software programmed with a display and notification control method. When executed by the computing system, display and notification control software directs the processing system to operate and to execute image display on a first display 62 and/or second display 64, as described herein below in further detail. Furthermore, the processing system can be configured to operate workstation status notifications such as light illumination, light intensity, colors, audible sounds, and/or vibrations. The computing system may include one or many application modules and one or more processors, which may be communicatively connected. The processing system may comprise a microprocessor (e.g., processor 112) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 114) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In the illustrated example, the controller 116 communicates with one or more components of the system 111 via communication links 113, which can be wired or wireless links. The controller 116 can be configured to monitor and/or control one or more operational characteristics of the system 111 and its various subsystems by sending and receiving control signals via the communication links 113. It should be noted that the extent of connections of the communication links 113 shown herein is for schematic purposes only, and the communication links 113 in fact provide communication between the controller 116 and each of the sensors, devices, and various subsystems described herein, although not every connection is shown in the drawing for purposes of clarity.

In the illustrated example, the controller 116 controls the first display 62 and/or the second display 64, and the controller 116 can coordinate display information on both the first display 62 and the second display 64. In one example, the displays 62, 64 display the same or complementary information. A location sensor 130 having an antenna 131 can be connected to the controller 116 and configured to communicate location data pertaining to the workstation 10 to a receiver 132. The location of the workstation 10 can be advantageous because the users will be able to search and locate other users throughout the work space even though the users are moving with their workstations 10 between positions. The location sensor 130 can create location data based on a GPS signal, WI-FI signal, proximity devices, and/or any other location device or system.

The system 111 can include several modules. A calendar module 118 can be connected to a network and provide meeting information. For instance the start time and end time for a meeting may be relayed by the calendar module 118 to the controller 116. The controller 116 may further relay data to the notification devices, such as lights 80 and/or speakers 82. In one example, the lights 80 may illuminate a green color at the start time of the meeting, illuminate a yellow color ten minutes before the end time of the meeting, and/or illuminate a red color at the end time of the meeting. A user interface module 119 may be included to allow the users to control the lights 80 and/or the speaker 82. For example, the user may increase the light from the lights 80 or play music and emit sound through the speaker 82. The user interface module 119 may be connected to a remote 120, a control panel, a connection port, and/or the like. A control module 121 such as an internet or network module may connect the workstation 10 to the internet. The control module 121 may also provide calendar data to the calendar module 118. The control module 121 may be wireless or wired, and the control module 121 may allow a remote user to control the components of the workstation 10 or participate in the meeting.

Referring back to FIGS. 1-8, the first display 62 and/or second display 64 are coupled to the workstation 10. The first display 62 is coupled to the track 50 as described above, and the second display 64 is coupled to the rear surface 36. The second display 64 has a display surface 65, and in some examples, the display surface 65 is flush with the rear surface 36. The controller 116 controls the first display 62 and/or second display 64 such that information is displayed by the displays 62, 64, respectively. The displays 62, 64 display data, information, and/or images and can be a computer monitor, a touchscreen computer, a white board, a chalk board, and/or the like. The second display 44 can be parallel or transverse with respect to the first display 62.

The workstation 10 includes a base 20 coupled to the first end 21. The base 20 supports the workstation 10 and extends radially from the front surface 34 and/or the rear surface 36. The base 20 includes wheels 22 configured to allow the workstation 10 to be moved on a horizontal surface such as a floor (not shown), and the workstation 10 includes bumpers 24 configured to prevent damage to the workstation 10 and/or other objects. The wheels 22 can be castors, rollers, glides, and/or the like. In some examples, the workstation 10 includes a motorized drive system such as a conventional electric motor (not shown) configured to drive the wheels to thereby move the workstation 10.

The workstation 10 includes a canopy 70 coupled to the second end 32 of the body 30. The canopy 70 extends radially horizontally from the body 30 (see FIGS. 4-5). The canopy 70 has an outer perimeter, and at least one light 80 is positioned adjacent the outer perimeter such that the lights 80 is directed toward the work surface 60 to illuminate the work surface 60. The lights 80 are controlled by the controller 116. In some examples, the canopy 70 includes speakers, fans, heaters, and/or the like.

The workstation 10 includes a storage drawer 90 which is configured to move between a first position where the storage drawer 90 is located in the cavity 39 (see FIG. 8) and a second position (not shown) where the storage drawer 90 extends axially outwardly from the front surface 33. The workstation 10 includes a shelf 92 configured to provide additional working surfaces for the user. The shelf 92 is recessed in the cavity 39 in a first position (see FIG. 8) and extends radially away from the body 30 in a second position (not shown). The workstation 10 includes an access panel 49 removably coupled to the body and configured to allow access to the cavity 39 for servicing or cleaning components positioned in the cavity 39.

In the present description, certain terms have been used for brevity, clearness and understanding. No unnecessary imitations are to be implied therefrom beyond the requirement of the prior art because such terms are used for descriptive purposes only and are intended to be broadly construed. The different apparatuses and systems described herein may be used alone or in combination with other apparatuses and systems. Various equivalents, alternatives and modifications are possible within the scope of the appended claims.

What is claimed is:

1. A mobile workstation for supporting a first display and a work surface, the mobile workstation comprising:
   a base supported on wheels;
   a body that extends in an axial direction from the base and has a front surface;
   a track coupled to the front surface and configured to support the first display and the work surface, wherein the first display and the work surface moveable along the track to a plurality of user-preferred positions;
   wherein the front surface extends along a first centerline;
   wherein the body further comprises a rear surface opposite the front surface, the rear surface extending along a second centerline; and
   wherein the first and second centerline are transversely orientated to each other.

2. The mobile workstation of claim 1, further comprising a bracket that couples the first display and the work surface to the track.

3. The mobile workstation of claim 1, wherein the base extends radially from the front surface.

4. The mobile workstation of claim 1, wherein the body comprises a rear surface and further comprising a second display coupled to the rear surface.

5. The mobile workstation of claim 4, wherein the second display has a display surface, and wherein the display surface is flush with the rear surface.

6. The mobile workstation of claim 1, further comprising a canopy coupled to the body and configured to radially extend from the body.

7. The mobile workstation of claim 6, wherein the canopy has an outer perimeter; and further comprising at least one light positioned adjacent the outer perimeter, wherein the at least one light is oriented toward the work surface.

8. The mobile workstation of claim 1, further comprising a storage drawer configured to move between a first position wherein the storage drawer is located inside the body and a second position wherein the storage drawer extends outwardly from the front surface.

9. A system comprising:
   a mobile workstation, the mobile workstation having a base supported on wheels; a body supported on the base, wherein the body has a front surface; a track coupled to the front surface; a first display coupled to and supported by the track, wherein the first display is moveable along the track to a plurality of user-preferred locations; and
   a controller that is configured to control the first display whereby information is displayed by the first display; and
   wherein the body has a rear surface; and further comprising a second display coupled to the rear surface, wherein the controller is configured to control the second display such that information is displayed by the second display;
   wherein the front surface extends along a first centerline and the rear surface extend along a second centerline, wherein the first and second centerlines are transversely orientated to each other.

10. The system of claim 9, wherein the controller is configured to coordinate the first display and the second display such that first and second displays display complementary information.

11. The system of claim 9, wherein the base extends radially with respect to the front surface.

12. The system of claim 9, wherein the mobile workstation further has a canopy having at least one light, wherein the controller controls the at least one light.

13. The system of claim 12, wherein the canopy has a perimeter whereby the at least one light is one of a plurality of lights disposed around the perimeter.

14. The system of claim 9, further comprising a location sensor that is configured to sense the location of the mobile workstation, wherein the controller is configured to control the first display to indicate the location of the mobile workstation to a user.

15. The system of claim 9, wherein the mobile workstation further has a work surface that is coupled to the track, wherein the work surface is movable by a user along the track to the user-preferred position.

16. The system of claim 15, wherein the work surface is movable independent of the first display.

17. The system of claim 16, further comprising a drive mechanism configured to move the work surface along the track.

* * * * *